(12) United States Patent
Boom

(10) Patent No.: US 8,134,375 B2
(45) Date of Patent: Mar. 13, 2012

(54) CAPACITIVE MEMS SENSOR DEVICE

(75) Inventor: Jeroen Van Den Boom, Horssen (NL)

(73) Assignee: NXP B.V., Eindhoven (NL)

( * ) Notice: Subject to any disclaimer, the term of this patent is extended or adjusted under 35 U.S.C. 154(b) by 499 days.

(21) Appl. No.: 12/301,163

(22) PCT Filed: May 14, 2007

(86) PCT No.: PCT/IB2007/051820
§ 371 (c)(1),
(2), (4) Date: Jun. 2, 2009

(87) PCT Pub. No.: WO2007/132422
PCT Pub. Date: Nov. 22, 2007

(65) Prior Publication Data
US 2010/0013501 A1    Jan. 21, 2010

(30) Foreign Application Priority Data
May 17, 2006 (EP) ................................... 06114074

(51) Int. Cl.
*G01R 27/28* (2006.01)
*H04R 11/04* (2006.01)
(52) U.S. Cl. ............... 324/679; 324/661; 381/355
(58) Field of Classification Search .......... 324/658–690, 324/691–693; 381/355
See application file for complete search history.

(56) References Cited

U.S. PATENT DOCUMENTS

| | | | | |
|---|---|---|---|---|
| 6,088,463 | A | * | 7/2000 | Rombach et al. ............. 381/174 |
| 6,285,769 | B1 | * | 9/2001 | Edelson et al. ................. 381/95 |
| 2006/0008097 | A1 | * | 1/2006 | Stenberg et al. .............. 381/113 |

FOREIGN PATENT DOCUMENTS
EP          1106981 A2      6/2001

OTHER PUBLICATIONS

Suyama et al. Micromachined Varactor with Wide Tuning Range, Elec. Lett, Online No. 19970628; Apr. 7, 1997.*

* cited by examiner

*Primary Examiner* — Melissa Koval
*Assistant Examiner* — Farhana Hoque

(57) ABSTRACT

The present invention relates to a capacitive MEMS sensor device for sensing a mechanical quantity. To provide such a capacitive MEMS sensor device which enables fast recovery from (near) sticking after a mechanical overload situation it is proposed that the sensor device comprises: —a first bias voltage unit (V1) for supplying a first bias voltage ($V_{bias\,1}$) to a first plate of said MEMS sensing element, —a second bias voltage unit (V2) for supplying a second bias voltage ($V_{bias2}$) to the second plate of said MEMS sensing element, —a signal processing (20) unit for processing said electrical quantity into an output signal ($V_{OUT}$), —a comparator unit (21) for comparing said output ($V_{OUT}$) signal to a reference signal ($V_{ref}$) for detection of an overload condition of said MEMS sensing element (10) and for outputting a comparator signal, —a control unit (22) for controlling the discharge of said MEMS sensing element (10) in case of an overload condition signalled by said comparator signal by connecting, in case of an overload condition, said first plate to a first discharge terminal (D) during a first time interval (T1) and said second plate to a second discharge terminal (D) during a second time interval (T2).

16 Claims, 6 Drawing Sheets

CAPACITIVE MEMS SENSOR DEVICE

The present invention relates to a capacitive MEMS sensor device for sensing a mechanical quantity, to an electronic circuit for such a capacitive MEMS sensor device and to a method for operating such a capacitive MEMS sensor device.

Today, MEMS (Micro Electro Mechanical System) sensors and actuators are a fast-growing market. The present invention relates to capacitive MEMS sensors, e.g. microphones, accelerometers and pressure sensors. Generally, such a MEMS sensor comprises a capacitor which includes two parallel plates. One rigid plate is, for instance, fixed onto a frame, the other plate (e.g. a membrane) moves or flexes under the influence of the mechanical quantity to be measured, e.g. acoustic (air) pressure or acceleration. A change in the distance between the plates results in a change of the capacitance, thus an electrical signal that can be measured and processed.

Depending on the application, the sensor will have to handle mechanical excitations over a wide amplitude range. In case of a MEMS microphone, the sound pressure may vary between 34 dB and 120 dB sound pressure level (SPL) or even higher. The mechanical properties of the membrane can be dimensioned to maximize the sensitivity while avoiding mechanical contact with the fixed plate. Still, there are occasions where the transient sound pressure exceeds the maximum level, like inside a train when it enters or leaves a tunnel. In this case, the distance between the plates may become very small or even zero.

At a very small distance, the electrical charge that is applied to the plates of the sensor causes an attracting electrical force between the plates and may lead to membrane sticking. This disables the sensor until the charge is sufficiently reduced, e.g. after power down. In order to prevent 'cold welding' of silicon on silicon, as the plates are often made of silicon, the membrane is often covered with an electrically insulating anti-sticking coating. The coating obstructs a discharge current between the plates and thereby a fast self-recovery from sticking.

The condition of near-sticking is not desirable either, because the large electrical signal leads to clipping of the signal-processing electronics, i.e. the pre-amplifier and/or analog-to-digital converter. This results in an error signal at the output, which lasts until the sensor and its electronics return to normal operation.

US 2006/0008097 A1 discloses a condensor microphone having a transducer element comprising a diaphragm having an electrically conductive portion, a back-plate having an electrically conductive portion, a DC bias voltage element operatively coupled to the diaphragm and the back-plate, a collapse detection element adapted to determine a physical parameter value related to a separation between the diaphragm and the back-plate, and a collapse control element adapted to control the DC bias voltage element based on the determined physical parameter value.

Figure 1:
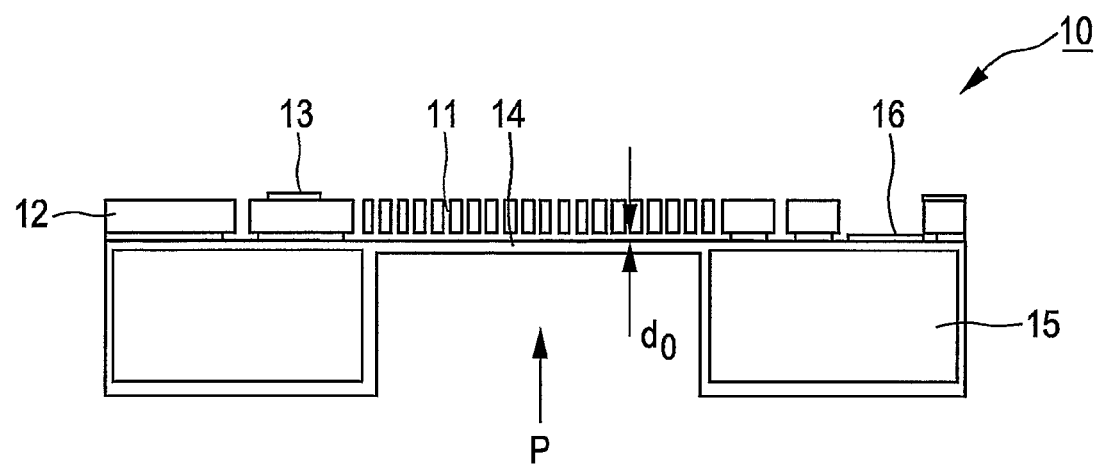

Referring to FIG. 1 of US 2006/0008097 A1, the DC voltage level at the "BIAS" terminal is explicitly defined by the voltage source and the series impedance. The IN terminal does not have an explicitly defined DC level. Apparently an ESD (Electrostatic Discharge) protection diode attached to the bondpad of the "IN" terminal takes care of this function, as it is commonly used for almost all IC pins to form a discharge path to ground. This has two undesirable side effects:

a) Closing the switch does not completely discharge the microphone. A residual voltage equal to the threshold voltage of the protection diode will remain present, which has an adverse effect on membrane recovery.

b) Closing the switch also causes a large transient signal on the amplifier input. As the transient will exceed the input range by a factor, the amplifier will likely clip. Even worse, this causes a very loud pop noise in the audio signal. In general, additional pop noise may be considered as a serious, unacceptable side effect in audio applications.

In summary, US 2006/0008097 A1 does not present a complete and/or optimum solution for the problem of a (nearly) sticking membrane.

It is an object of the present invention to provide a capacitive MEMS sensor device which enables fast recovery from (near-)sticking after a mechanical overload situation. It is further object of the present invention to provide a corresponding electronic circuit for such a capacitive MEMS sensor device and a corresponding method for operating such a capacitive MEMS sensor device.

The object is achieved according to the present invention by a capacitive MEMS sensor device as claimed in claim 1, comprising:

a capacitive MEMS sensing element having two plates arranged in parallel at a distance that varies in response to said mechanical quantity and for converting the sensed mechanical quantity into an electrical quantity, a first bias voltage unit for supplying a first bias voltage to a first plate of said MEMS sensing element, a second bias voltage unit for supplying a second bias voltage to the second plate of said MEMS sensing element, a signal processing unit for processing said electrical quantity into an output signal, a comparator unit for comparing said output signal to a reference signal for detection of an overload condition of said MEMS sensing element and for outputting a comparator signal, a control unit for controlling the discharge of said MEMS sensing element in case of an overload condition signalled by said comparator signal by connecting, in case of an overload condition, said first plate to a first discharge terminal during a first time interval and said second plate to a second discharge terminal during a second time interval.

A corresponding electronic circuit for such a capacitive MEMS sensor device is defined in claim 11, a corresponding method for operating such a capacitive MEMS sensor device is defined in claim 12. Preferred embodiments of the invention are defined in the dependent claims.

The present invention is based on the idea to apply a dual-switch principle for separately controlling the discharge of the two plates of the sensing element in case of an overload condition (it shall be noted that the expression "overload condition" shall also included near-overload conditions). This dual-switch principle ensures the fastest possible recovery from a mechanical (near-)overload. During the recovery, the voltage (DC) level at the input of the signal processing unit remains equal to the nominal level of the first bias voltage applied to the first plate. In case of application of the invention as a MEMS microphone, this has the effect of audio muting, i.e. the transient effects are limited to the effect of reducing the sensor's sensitivity to zero. Additionally, the pop noise is minimized.

Compared to the solution described in US 2006/0008097 A1 the solution of the present invention overcomes both problems. According to the present invention a well-defined bias voltage is received on both sensor terminals. Since the sensing element will, in case of a (near-)overload condition, be short-circuited, no residual voltage will be left. This yields the fastest membrane recovery. Further, since the first bias voltage is short-circuited, the DC level at the signal processing unit will not change so that the pop noise is minimized.

There is another benefit of the presented solution versus the solution of US 2006/0008097 A1. The comparator shown FIG. 1 of US 2006/0008097 A1, directly senses the microphone signal. The comparator's input capacitance acts as an extra capacitive load for the sensor, causing undesired signal loss. In the present solution, however, the comparator senses the signal after the signal processing unit, thus avoiding extra capacitive loading. Although the comparator's input capacitance may be less than 10% of the sensor's capacitance, even a 1 dB signal loss is critical because today's signal-to-noise requirements are a limiting factor.

According to a preferred embodiment, as defined in claim 2, the first bias voltage unit that is adapted for providing a first bias voltage to the first plate of the sensing element is a low-impedance voltage unit, whereas the second bias voltage unit, that is adapted to provide a second voltage to the second plate of the sensing element, is a high-impedance voltage unit. The recharge time of the sensing element in case of a (near-overload condition is thus almost entirely determined by the high impedance of the second voltage unit. The shortest possible recharge time ensures the shortest recovery time after which the sensor can resume normal operation.

In a further embodiment the connection between said first voltage source and that first impedance element is provided as said first and second discharge terminal, i.e. there is only one common discharge terminal used.

According to a still further embodiment the supply voltage of said first voltage source is larger than the supply voltage of said second voltage source. This has the advantage that the sensor sensitivity is proportional to the voltage across the two plates of the MEMS sensor. Since the sensor sensitivity should be high, so that the voltage applied to the first plate, i.e. the first bias voltage, should be high, e.g. larger than an available supply voltage. For the voltage applied to the second plate, i.e. the second bias voltage, a convenient value between 0 and the available supply voltage is selected to facilitate easy DC coupling to the signal processing unit.

Preferably, the first and second time intervals have substantially the same start time, but the first time interval is shorter than the second time interval. Thus, during the first time interval both plates of the sensing element are connected to their respective discharge terminals (or to a common discharge terminal, as used in a preferred embodiment) so that the voltage applied over both plates is decreased to zero while the voltage level at the second plate remains unaltered. After the first time interval the first plate is no longer connected to the discharge terminal so that the respective bias voltage of the sensing element (i.e. the first bias voltage applied to the first plate) will be restored. However, the second plate is still connected to the second voltage source for some time (until the end of the second time interval) ensuring that the recharge time is reduced by a factor depending on the impedance values of the first and second voltage units. After the second time interval the second bias voltage is again supplied to the second plate of the sensing element, and the electronic circuit returns from a voltage source mode (having a low impedance) into a charge pump mode (having a high impedance) again. The MEMS sensor device is then again ready for accurate conversion of a mechanical input signal into an electrical output signal.

The discharge time is only limited by the residual resistance of the switches and the wires. The discharge time is preferably much smaller than the mechanical recovery time of the membrane. The first time interval is preferably slightly longer than the mechanical recovery time. The second time interval is preferably long enough to recharge the sensor to e.g. 90% of the final value.

In order to implement said first and second time intervals, in a preferred embodiment the control unit comprises a first pulse generator having a first pulse time corresponding to said first time interval and a second pulse generator having a second pulse time corresponding to said second time interval. Said pulse generators control, for instance, first and second switches as defined in claim 8 for connecting the respective plates of the sensing element to their respective discharge terminal.

The output signal of the MEMS sensor according to the present invention can be analog or digital. An embodiment for obtaining an analog output signal is defined in claim 9, an embodiment for obtaining a digital output signal is defined in claim 10. Preferably, in said digital embodiment the comparator is implemented as a simple counter for counting a predetermined number of subsequent bits having a predetermined bit value, e.g. for detecting a series of subsequent "1"s or "0"s depending on the polarity of the counter.

The MEMS sensor according to the present invention can be applied for different purposes. For instance, the MEMS sensor can be a MEMS microphone (e.g. for use in a cell phone), an accelerometer and a pressure sensor.

Figure 2:
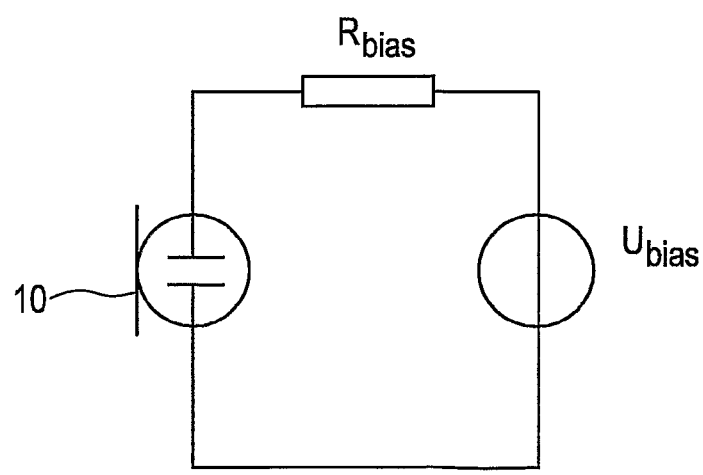
Figure 3:
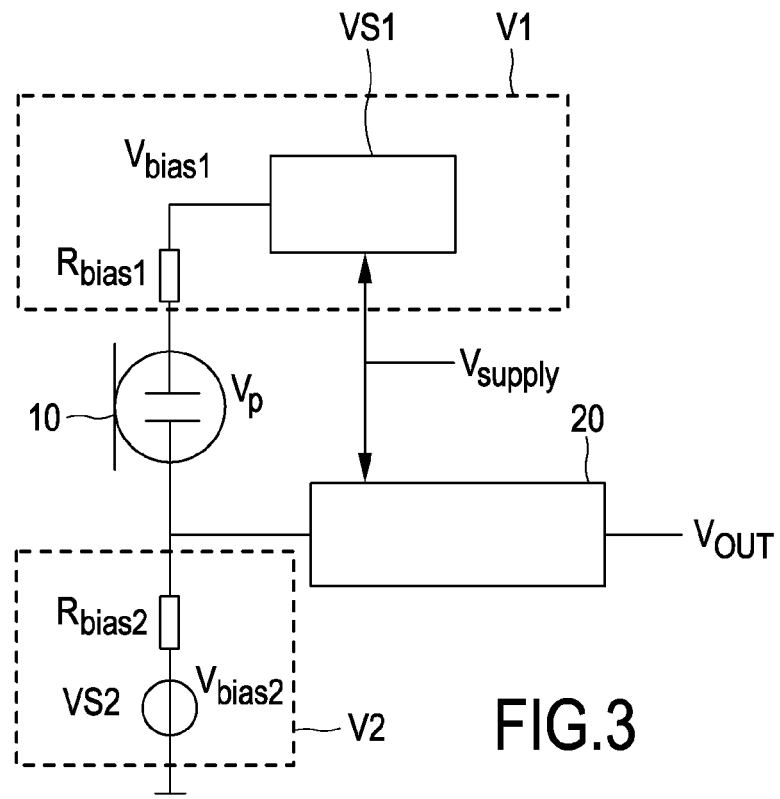
Figure 4:
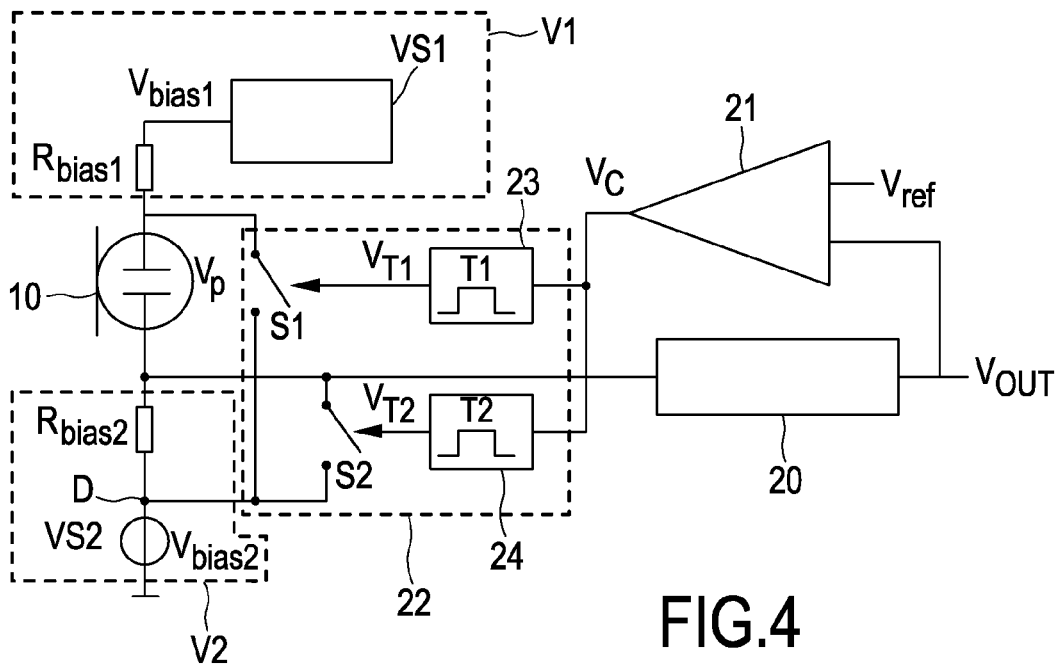
Figure 5:
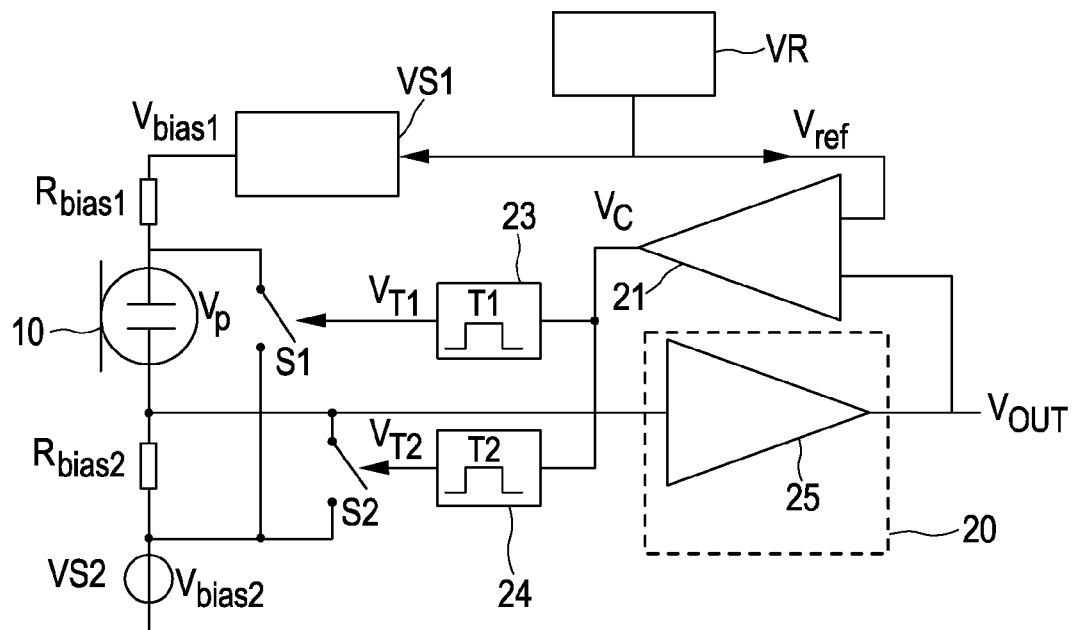
Figure 6:
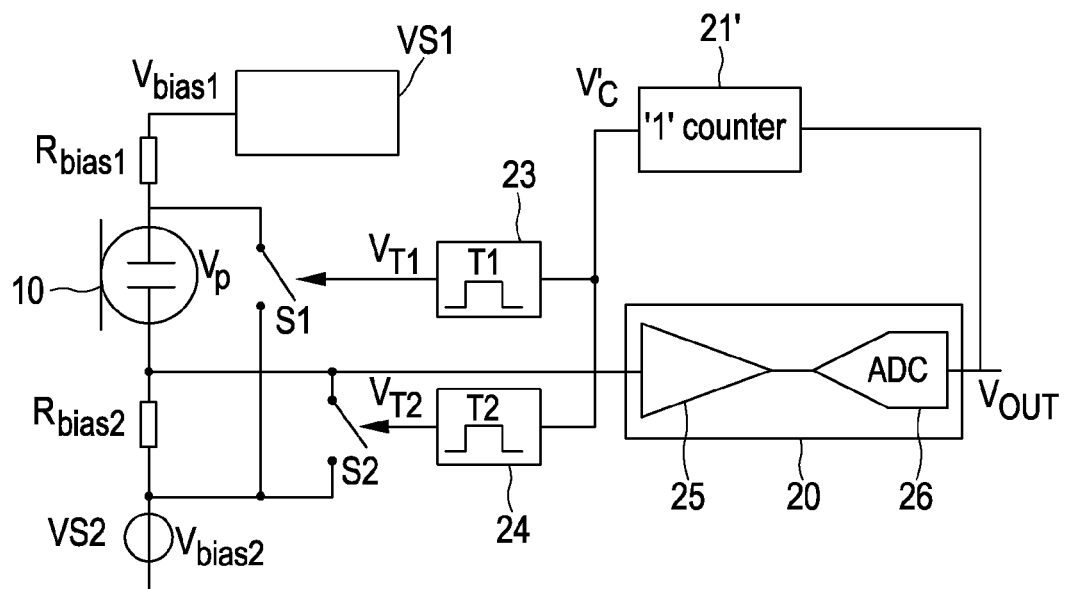

The invention will now be explained in more detail with reference to the drawings in which FIG. 1 shows the principle of a capacitive MEMS sensor, FIG. 2 shows a simple bias circuit for a MEMS sensor, FIG. 3 shows a circuit diagram of a practical realisation of a bias circuit for a MEMS sensor, FIG. 4 shows a circuit diagram of a capacitive MEMS sensor device according to the present invention, FIG. 5 shows a circuit diagram of an analog implementation of a MEMS sensor device according to the present invention, FIG. 6 shows a circuit diagram of a digital implementation of a MEMS sensor device according to the present invention, FIG. 7 shows signal diagrams of signals in the analog implementation and FIG. 8 shows signal diagrams of signals in the digital implementation.

Figure 9:
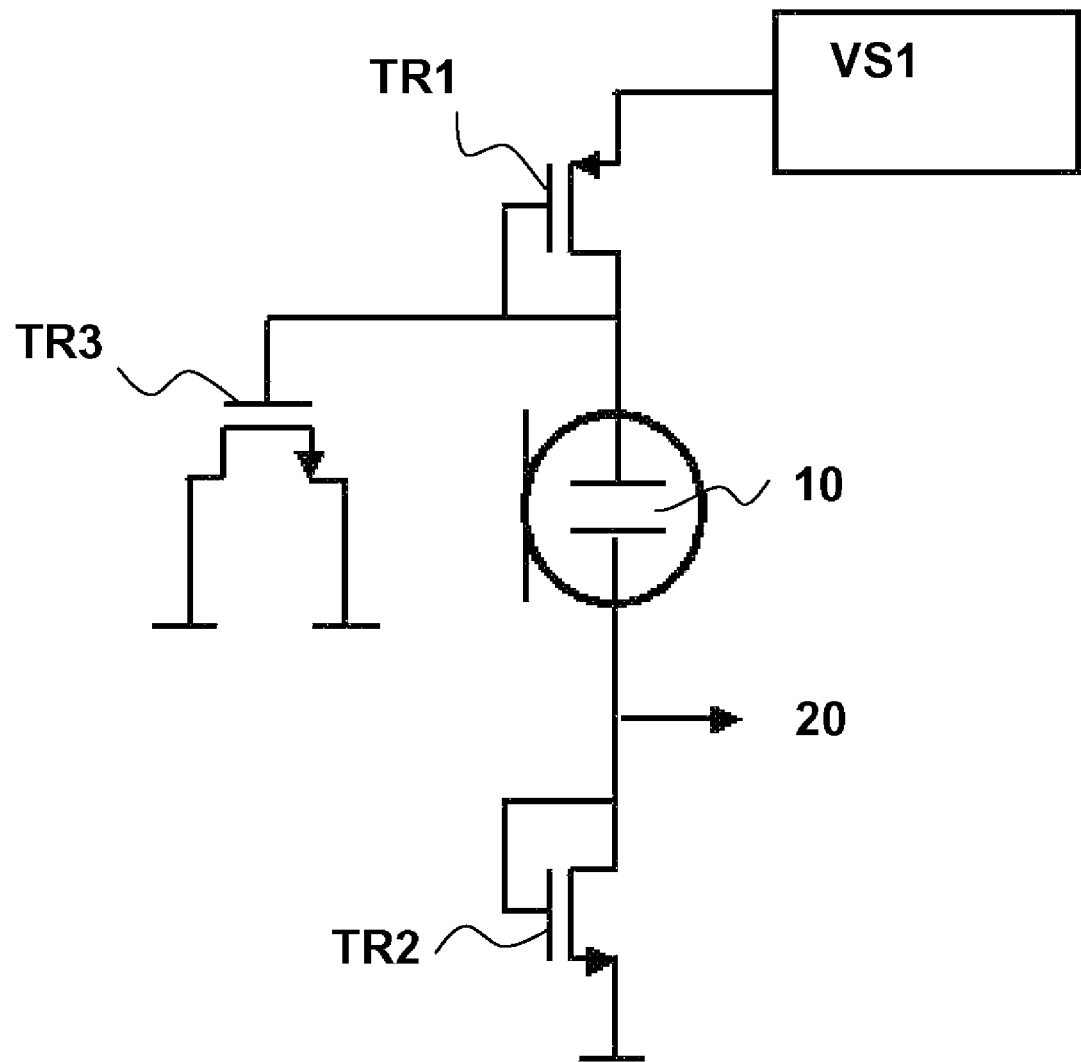

FIG. 9. shows a practical solution of an RC filter for use in combination with a voltage multiplier Throughout the subsequent text, a MEMS microphone is generally mentioned as an exemplary embodiment of the present invention. However, the invention can generally be applied to all capacitive MEMS sensors and is not limited to a MEMS microphone.

FIG. 1 shows the principle of a capacitive MEMS sensor 10 for converting a mechanical quantity P, e.g. an incident acoustic pressure, into a change of capacitance by variation of the distance between the capacitor plates 11, 14. The capacitor comprises two parallel plates, in particular one rigid plate 11 which is fixed onto a first frame 12 and connected to an electrical contact 13 and another plate 14 (in particular a membrane) which is connected to a second frame 15 (which can form one rigid unit with the first frame 12, but is electrically isolated therefrom) and connected to an electrical contact 16. The latter plate 14 moves or flexes under the influence of the mechanical quantity P to be measured, e.g. acoustic (air) pressure or acceleration. A change in the distance $d_0$ between the plates 11 and 14 results in a change of the capacitance, i.e. in a measurable electrical signal.

The nominal capacitance is $$C_0 = \epsilon A/d_0, \quad [1]$$

where A is the plate area and $d_0$ is the default distance between the plates 11, 14. A mechanical excitation changes the distance from $d_0$ to $d_0+\Delta d$. When a constant charge Q is applied to the plates, the voltage $V_P$ across the plates 11, 14 changes according to $$Q=CV_P. \quad [2]$$

Combining both equations it can be found $$\Delta V_P = Q\Delta d/\epsilon A. \quad [3]$$

Assuming that there is a linear relationship between $\Delta d$ and the mechanical quantity to be measured, this linearity also holds for the voltage $\Delta V_P$.

It shall be noted that the use of a constant-voltage bias between the plates 11, 14 is not recommended because it leads to an increasing attractive force between the plates 11, 14 when the distance d becomes smaller, and because of the inversely proportional (non-linear) relationship between d and C.

In some non-MEMS sensors like electret microphones, the bias charge is statically present inside the membrane. For a MEMS sensor this is not possible. That is why there is a need for an external bias circuit for providing a bias voltage $V_{bias}$ to the MEMS sensor 10 as shown in FIG. 2, which illustrates the principle of a constant-charge bias circuit for a MEMS sensor. In IC technology, the bias resistor $R_{bias}$ may be implemented as a low-duty cycle switching circuit or as long-channel MOS transistors in weak inversion. For frequencies above $\frac{1}{2\pi} R_{bias} C_o$ the circuit behaves as a constant-charge bias. A practical value for this corner frequency is the lower end of the audio spectrum, e.g. 50 Hz.

In IC technology it is desirable to have a convenient DC level at the capacitor plate connected with the signal processing electronics, including e.g. a pre-amplifier. A practical value for the bias voltage $V_{bias1}$ is in general higher than the supply voltage of the pre-amplifier and other signal-processing electronics. Therefore, a high-impedance bias generator V2 including a voltage source VS2 and a bias impedance $R_{bias2}$ defines the DC level $V_{bias2}$ of this plate, while a second, low-impedance bias generator V1 including a voltage source VS1 (e.g. including a voltage multiplier for deriving the bias voltage $V_{bias1}$ from a supply voltage $V_{supply}$) and a bias impedance $R_{bias1}$ defines the (high) DC level $V_{bias1}$ of the other plate. This is shown in FIG. 3 which illustrates a practical realization of the sensor biasing (where preferably $R_{bias2} \gg R_{bias1}$). A likely circuit for the latter generator is a Dickson voltage multiplier. The sensor output signal of the MEMS sensor 10 is processed by a signal processing unit 20 which particularly includes a preamplifier to obtain the output signal $V_{OUT}$ of the sensor arrangement.

A first embodiment of a MEMS sensor arrangement according to the present invention based on the dual-switch recovery principle is shown in FIG. 4.

Besides the MEMS sensor 10, the first and second bias voltage units V1, V2 and the signal processing unit 20 the MEMS sensor device according to the present invention further comprises a comparator 21 and a control unit 22 for controlling the discharge of said MEMS sensor 10 in case of an overload condition. Said control unit 22 comprises a first and a second (preferably one-shot) pulse generator 23, 24 for generating pulse signal $V_{T1}$ and $V_{T2}$, respectively, having predetermined pulse times T1 and T2, respectively. By the pulses of said pulse generators 23, 24 respective switches S1, S2 are controlled by which the plates of the MEMS sensor 10 are separately connected to a discharge terminal D for predetermined intervals.

Preferably, the first plate is the membrane to which the first bias voltage $V_{bias1}$ is applied. This has a slight advantage because the parasitic capacitance to the substrate (15 in FIG. 1) is then smaller. However, the membrane can also be the second plate.

The recovery circuit shown in FIG. 4 for dealing with an overload comprises a feedback loop with basically the following components:

a) The comparator 21 compares the output signal $V_{OUT}$ of the signal-processing unit 20 to a predetermined reference level $V_{ref}$. In case of a (near-)overload condition, the output signal $V_{OUT}$ becomes active. The reference level $V_{ref}$ is related to $V_{bias1}$ and $V_{bias2}$. The bias voltages are, for instance, related to a bandgap reference voltage (e.g. 1.2V), e.g. a fixed factor times the bandgap reference voltage. The sensor sensitivity is equal to $V_{bias1} - V_{bias2}$. Mechanical dimensions, stiffness, compliance etc. determine which output voltage ($V_{max}$) corresponds with an overload condition. Hence, the reference voltage $V_{ref}$ is a fraction of $V_{bias1} - V_{bias2}$. $V_{ref}$ is set equal to $V_{bias2} + V_{max}$. Thus, an accurate definition of sensitivity and overload level are possible.

b) The output signal $V_C$ of the comparator 21 controls the mono-stable pulse generator 23 having a pulse time T1. This generator 23 controls a switch S1. It will keep the switch S1 closed during a pre-defined time T1, sufficiently long to enable the first plate of the MEMS sensor 10 (in particular the membrane) to return to its normal position.

c) The output signal $V_C$ of the comparator 21 also controls the mono-stable pulse generator 24 having a pulse time T2. T2 is preferably longer than T1. This second generator 24 controls the switch S2. When both switches S1 and S2 are closed, they form a discharge path for the sensor 10. After the interval T1, the switch S1 will open and the voltage across the sensor 10 will be restored.

Since $R_{bias2} \gg R_{bias1}$, the recharge time is almost entirely determined by $R_{bias2}$. By keeping the switch S2 still closed, the recharge time will be reduced by a factor of $R_{bias2}/(R_{bias1}+R_{bias2})$. After the interval T2, also the switch S2 is released so that the bias circuit returns from voltage source (low impedance) mode into a charge pump (high impedance) mode again. The sensor 10 is now ready again for accurate conversion of the input signal.

As has been explained the one-shot pulse T1 is mainly necessary to enable the membrane to return to its normal position. The recovery time depends on the mechanical characteristics of the device. Recovery cannot be measured electronically because closing S1 and S2 directly restores the electrical signal at the output terminal $V_{OUT}$, which resets the comparator 21.

The dual-switch principle ensures the fastest possible recovery from a mechanical (near-)overload. During the recovery, the DC level at the input of the signal processing unit 20 remains equal to the nominal level $V_{bias2}$. In case of using the invention in a MEMS microphone, this has the effect of audio muting, in other words, the transient effects are limited to the effect of reducing the sensor's sensitivity to zero. Additionally, the pop noise is minimized.

When viewed in the frequency domain, the two mono-stable pulse generators act as low-pass filters in the loop to ensure stable operation.

Preferably, due to the small size of the MEMS sensor, signal processing is done in the direct vicinity of the MEMS sensor in order to minimize signal loss in parasitic capacitance of the interconnection. Thus, the MEMS sensor and the electronic circuit are preferably packed together in a Multi-Chip Module (MCM) or integrated on one chip.

The output signal $V_{OUT}$ of the sensor device can either be analog or digital. In case of an analog output, the electronic circuit—as shown in the circuit diagram of FIG. 5—contains at least two functional blocks, the bias voltage units V1, V2 and the signal processing unit 20 including a pre-amplifier 25. Here, the comparator unit 21 comprises an analog comparator. Its reference level is related to the bias voltage $V_{bias1}$ over the sensor 10, which in turn is usually derived from a bandgap voltage reference unit VR providing the reference voltage $V_{ref}$. The implementation shown in FIG. 5 is, for instance, preferably used for a MEMS microphone.

In case of a digital output, the electronic circuit—as shown in the circuit diagram of FIG. 6—comprises as third functional block an Analog-to-Digital Converter (ADC) 26. In some implementations, the pre-amplifier 25 and ADC 26 are interwoven so that only the digital output can be accessed to recognize an overload condition. This is not a limitation because a digital comparator function is preferable over an analog one for reasons of current consumption (which is, for instance, important for mobile applications), ease of design, chip area (cost) and accuracy. The common ADC type is a 1-bit Sigma-Delta ADC. Its output signal is a pulse-density modulated bitstream. In case of overload, the stream will consist of a series of subsequent '1's or '0's, depending on the polarity. Hence, the digital comparator 21' can be a simple counter. Its output $V'_C$ becomes active in case a pre-defined number of subsequent '1's occurs. A specific advantage of this digital comparator 21' is that the reference level $V_{ref}$ is simply a programmable number.

To illustrate more clearly the function of the invention FIG. 7 shows timing diagrams of the signal appearing in the analog implementation as depicted in FIG. 5.

Figure 7A:
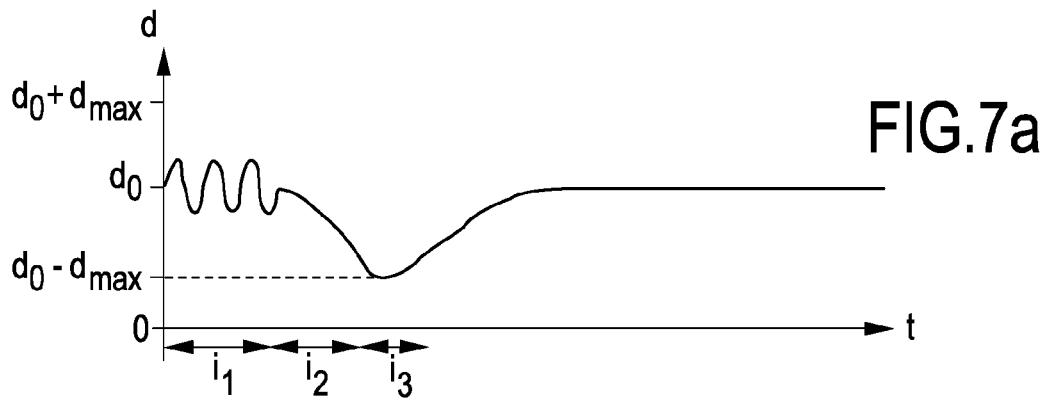

FIG. 7a shows the distance d between the plates of the MEMS sensor 10. To illustrate normal operation, during interval i1 a sinusoidal input signal of normal amplitude is applied. The distance varies around do with an amplitude smaller than $d_{max}$. At the start of interval i2, a mechanical overload signal occurs which reduces the distance to $d_0-d_{max}$. At this point (end of interval i2, start of interval i3), an overload condition appears that is detected.

Figure 7B:
Figure 7C:

FIG. 7b shows the output voltage $V_{OUT}$ of the signal processor. The overload condition is detected when $V_{OUT}$ exceeds $V_{ref}$. FIG. 7c shows the comparator output signal $V_C$. At detection of the overload condition, the comparator output becomes active.

Figure 7D:
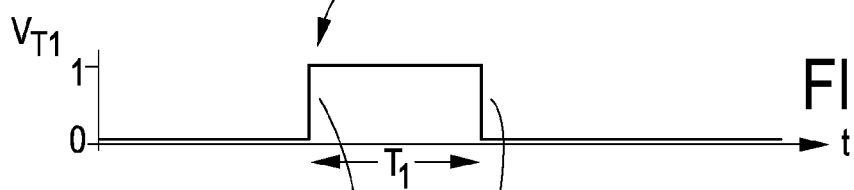
Figure 7E:
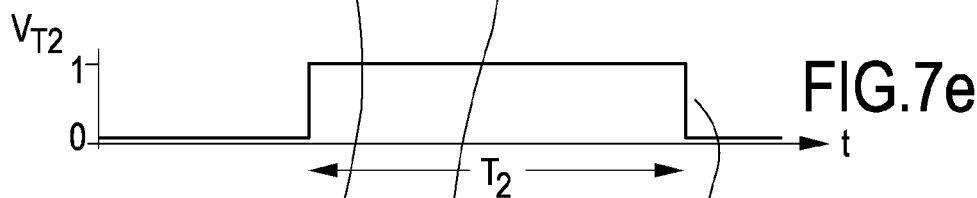

FIGS. 7d and 7e show the output signals $V_{T1}$ and $V_{T2}$ of the pulse generators 23 and 24. It can be seen that the detection of the overload condition causes the output of pulse generators 23 and 24 to become active simultaneously, which closes the switches S1 and S2.

Figure 7F:
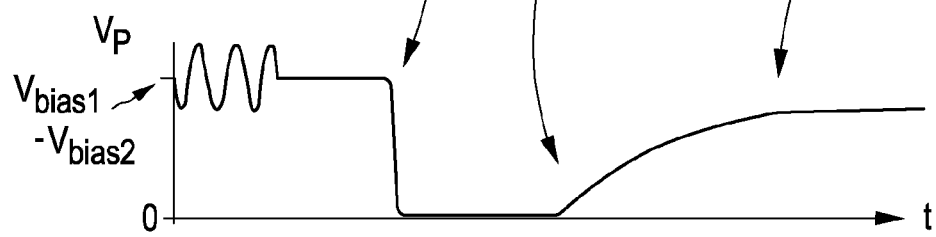

FIG. 7f shows the voltage $V_P$ (=$V_{plate1}-V_{plate2}$) across the two plates 11, 14 of the sensor. Closing the switches S1 and S2 causes a short circuit between the plates so $V_P$ becomes zero.

As can be seen in FIG. 7a, during interval T1, the membrane returns to its normal position. Here it acts as a purely mechanical spring-mass system. No electrical force is present. After interval T1, the pulse generator 23 returns to inactive and the switch S1 is re-opened, as can be seen from FIG. 7d. As FIG. 7f illustrates, the sensor is rapidly recharged over $R_{bias1}$, which is low-ohmic. The voltage reaches e.g. 90% of the final value $V_{bias1}-V_{bias2}$, and the sensor device is ready again for signal conversion.

After interval T2, the pulse generator 24 returns to inactive and the switch S2 is re-opened, (see FIG. 7e.) As FIG. 7f illustrates, the sensor recharges slowly to its final value over $R_{bias1}$ and $R_{bias2}$, where $R_{bias2}$ is high-ohmic hence dominant.

FIG. 8 shows timing diagrams of the input signal $V_{OUT}$ and the output signal $V_C$ of the comparator (counter) 21' in the digital implementation as depicted in FIG. 6.

Figure 8A:
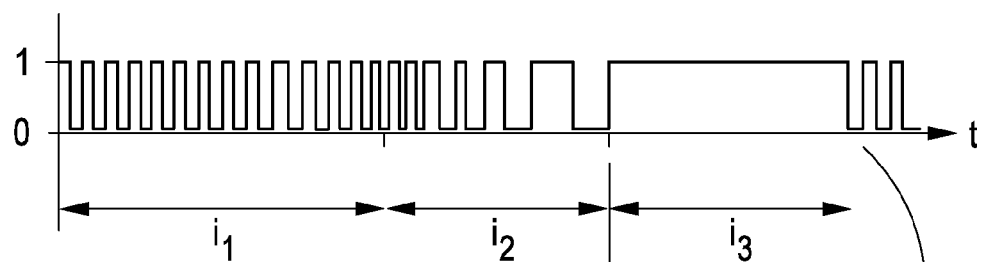

FIG. 8a shows the output signal $V_{OUT}$ of the Sigma-Delta ADC 26 (depictive, not on an accurate time schale) in case of a distance signal d as shown in FIG. 7a. During interval i1 there is normal sensor operation. The ADC produces a stream of '1's and '0's with on average equal occurrence. During interval i2, the sensor moves towards overload. The fraction of '1's in the ADC stream rises from 50% to almost 100%. Interval i3 represents the overload situation, where the stream only contains '1's.

Figure 8B:

As can be seen from FIG. 8b showing the output signal $V'_C$ of the comparator (counter) 21', initially the counter output is inactive. At the end of interval i2, the ADC stream (see FIG. 8a) contains no more '0's and the counter starts counting without being reset. During the counter length L it receives no '0's. After L it has counted the preset number of subsequent '1's and the counter output becomes active. At the end of interval i3, the sensor has left the overload region and the ADC 26 produces its first '0' again, which resets the counter 21'.

It shall be noted that even one '0' in the stream $V_{OUT}$ is sufficient to reset the counter 21' and that the preset number is the digital equivalent of the reference voltage $V_{ref}$ used in the analog implementation, both being regarded as a "reference signal" in the present application.

In a practical design the Sigma-Delta ADC 26 is probably not be able to reach a 0% or 100%) modulation level, i. e. an output consisting of exclusively '0's or '1's, but just a lower modulation level, e.g. 5%-95%. In this case, the output of the comparator (counter) 21' has to become active, when a pre-defined ratio of '1's and '0's (e.g. 10:1) is exceeded. In one embodiment the ratio between the output of a first counter for the '1's and a second counter for the '0's is evaluated. Alternatively, the preset number of subsequent '1's once the output of a single counter becomes active can be lowered compared to the counter for the 100% modulation level so that the discharge procedure is initiated after the same time of overload condition. That means that defining the preset number of subsequent '1's depends on the tolerated time duration of overload condition, the output frequency of the Sigma-Delta ADC 26 and the modulation level which is reached at overload.

Another limitation for the application of a Sigma-Delta ADC 26 in a practical design is the signal headroom in the Sigma-Delta ADC 26. In some circuit designs, the total gain of pre-amplifier 25 and the Sigma-Delta ADC 26 is dimensioned such that the maximum ADC modulation level coincides with the maximum input signal swing. One reason for such a design is that the signal-to-noise ratio of the Sigma-Delta ADC 26 can be a limiting factor in the signal path, meaning that the Sigma-Delta ADC 26 can be the weakest part in the chain with respect to the SNR. So, even signals in the normal operation mode can cause a maximum signal at the output of the Sigma-Delta ADC 26, i.e. the Sigma-Delta ADC 26 can start to clip even in the normal operation mode. However, this means there is no headroom left for larger signal excursions which could be used to identify an upcoming overload condition. In this case, the overload detection has to be performed by an (additional) analog comparator 21 as depicted in FIG. 5. In FIG. 3 a low-impedance bias generator $V_1$ including a voltage source VS1 (e.g. including a voltage multiplier for deriving the bias voltage $V_{bias1}$ from a supply voltage Vsupply) and a bias impedance $R_{bias1}$ was used to define the (high) DC level $V_{bias1}$ of the other plate. A common way to implement said voltage multiplier is a circuit consisting of switches and capacitors. By stacking the charged capacitors the unloaded output voltage becomes the sum of the individual capacitor voltages. Unfavorably, a resistive load causes a ripple on the output voltage at the switch frequency of the voltage multiplier. Although the ripple's frequency is well above the audio band (20 kHz), it may still harm the audio performance because aliasing in the Sigma-Delta ADC 26 can fold the ripple frequency back into the audio band. Hence, an RC filter is used to suppress the ripple at the bias voltage when a load current is drawn from the voltage multiplier.

FIG. 9. shows a practical solution which saves chip area in comparison to a traditional fully-integrated anti-aliasing filter. In one embodiment the resistor $R_{bias1}$ is implemented as a diode, e.g. by a PN-junction or a long-channel MOS transistor TR1 whose gate is connected to the drain and which then acts as a diode. The capacitor is implemented as gate of a MOS transistor TR3. A typical capacitor value is one order larger than the sensor's capacitance. The large decoupling capacitor provides a low impedance level for audio frequencies so effectively the upper sensor node acts as a virtual ground.

The use of a nonlinear diode for $R_{bias1}$ offers two advantages. On the one hand the diode (respectively the transistor TR1 acting as a diode) acts as a low-ohmic resistor and enables fast charging when the bias voltage across the sensor is lower than the voltage multiplier output (directly after power-on or after recovering from an overload). On the other hand the diode has to supply only the (very low) leakage current of the sensor in a steady state. Hence, the voltage across the diode is low why the diode acts as a very high impedance. As a result the RC time constant of the filter becomes sufficiently long to suppress the ripple to a level where aliasing products remain below the noise floor. Additionally, the DC impedance level at the upper node of the sensor is very high. The large decoupling capacitor provides a low AC impedance level for audio frequencies so effectively the upper node acts as a virtual ground.

In an further embodiment the resistor $R_{bias2}$ and voltage source $V_{bias2}$ are also implemented as a diode or a long-channel MOS transistor TR2 whose gate is connected to the drain and which then acts as a diode. Similarly, it will also conduct a very small leakage current in the steady state. For a PN diode this results in a forward bias of a few hundred mV. For the long-channel MOS transistor TR2 it will also result a Vds of a few hundred mV, which is a convenient DC level for the pre-amplifier 25.

Fields of application of the present invention are all capacitive MEMS sensors, e.g. MEMS microphones, accelerometers and pressure sensors. For instance, the invention can be used as a microphone for a cell phone. In another application a magnetic compass, GPS and MEMS accelerometer sensors shall be combined for accurate positioning in portable electronics like cell phones.

In summary, the present invention provides a novel feedback loop for the electronics in capacitive MEMS sensor devices. Its purpose is to let the sensor and its signal-processing electronics recover quickly from an overload caused by a mechanical over-excitation. This invention strongly reduces the duration of the resulting error signal, which is a benefit to the quality of the application. A fast recovery is obtained by an improved bias circuit, no audible side effects are obtained (in case of use as a microphone).

The invention claimed is:

1. A capacitive Micro Electro Mechanical System (MEMS) sensor device that senses a mechanical quantity, the capacitive MEMS sensor comprising:
    a capacitive MEMS sensing element, having two plates arranged in parallel at a distance that varies in response to said mechanical quantity, that converts the sensed mechanical quantity into an electrical quantity;
    a first bias voltage unit that supplies a first bias voltage ($V_{bias\ 1}$) to a first plate of said capacitive MEMS sensing element;
    a second bias voltage unit that supplies a second bias voltage ($V_{bias\ 2}$) to the second plate of said capacitive MEMS sensing element;
    a signal processing unit that processes said electrical quantity into an output signal ($V_{OUT}$);
    a comparator unit that compares said output signal ($V_{OUT}$) to a reference voltage ($V_{ref}$) to detect an overload condition of said capacitive MEMS sensing element and outputs a comparator signal; and
    a control unit that controls the discharge of said capacitive MEMS sensing element based upon said comparator signal by connecting, after detection of the overload condition, said first plate to a discharge terminal during a first time interval and said second plate to the discharge terminal during a second time interval wherein the first bias voltage and the second bias voltage are separately controlled.

2. The capacitive MEMS sensor device as claimed in claim 1, wherein said first bias voltage unit comprises:
    a first voltage source; and
    a first impedance element having a low impedance and connected between said first voltage source and said first plate, and wherein said second bias voltage unit comprises:
    a second voltage source; and
    a second impedance element having a high impedance and connected between said second voltage source and said second plate.

3. The capacitive MEMS sensor device as claimed in claim 2, wherein the discharge terminal connects said second voltage source and said second impedance element.

4. The capacitive MEMS sensor device as claimed in claim 2, wherein a supply voltage of said first voltage source is larger than a supply voltage of said second voltage source.

5. The capacitive MEMS sensor device as claimed in claim 1, wherein said first time interval and said second time interval have substantially identical start times and said first time interval is shorter than said second time interval.

6. The capacitive MEMS sensor device as claimed in claim 1, wherein said control unit comprises:
    a first pulse generator having a first pulse time corresponding to said first time interval; and
    a second pulse generator having a second pulse time corresponding to said second time interval.

7. The capacitive MEMS sensor device as claimed in claim 1, wherein said discharge terminal corresponds to a bias voltage supply terminal of said second bias voltage unit.

8. The capacitive MEMS sensor device as claimed in claim 1, wherein said control unit comprises
    a first switch that connects said first plate to said discharge terminal during said first time intervals; and
    a second switch that connects said second plate to said discharge terminal during said second time interval.

9. The capacitive MEMS sensor device as claimed in claim 1, wherein said signal processing unit comprises:

an analog signal amplifier, wherein said comparator unit comprises:
an analog comparator, and wherein said first bias voltage is derived from said reference voltage.

10. The capacitive MEMS sensor device as claimed in claim 1, wherein said signal processing unit comprises:
an analog signal amplifier that produces an amplifier output signal; and
an analog-to-digital converter that converts the amplifier output signal into a digital output signal, and wherein said comparator unit comprises:
a digital counter that detects a predetermined number of subsequent bits having a predetermined bit value.

11. An electronic circuit for a capacitive Micro Electro Mechanical System (MEMS) sensor device that senses a mechanical quantity, the capacitive MEMS sensor device comprising a capacitive MEMS sensing element having two plates arranged in parallel at a distance that varies in response to said mechanical quantity and converting the sensed mechanical quantity into an electrical quantity, the electronic circuit comprising:
a first bias voltage unit that supplies a first bias voltage to a first plate of said capacitive MEMS sensing element;
a second bias voltage unit that supplies a second bias voltage to a second plate of said capacitive MEMS sensing element;
a signal processing unit that processes said electrical quantity into an output signal;
a comparator unit that compares said output signal to a reference signal to detect an overload condition of said capacitive MEMS sensing element and outputs a comparator signal; and
a control unit that controls the discharge of said capacitive MEMS sensing element based upon said comparator signal by connecting, after detection of the overload condition, said first plate to a discharge terminal during a first time interval and said second plate to the discharge terminal during a second time interval, wherein the first bias voltage and the second bias voltage are separately controlled.

12. A method of operating a capacitive Micro Electro Mechanical System (MEMS) sensor device that senses a mechanical quantity, the capacitive MEMS sensor comprising a capacitive MEMS sensing element having two plates arranged in parallel at a distance that varies in response to said mechanical quantity and converting the sensed mechanical quantity into an electrical quantity, the method comprising:
supplying a first bias voltage to a first plate of said capacitive MEMS sensing element;
supplying a second bias voltage to the second plate of said capacitive MEMS sensing element;
processing said electrical quantity into an output signal;
comparing said output signal to a reference signal to detect an overload condition of said capacitive MEMS sensing element;
outputting a comparator signal based upon the comparison; and
controlling the discharge of said capacitive MEMS sensing element based upon said comparator signal by connecting, after detection of the overload condition, said first plate to a discharge terminal during a first time interval and said second plate to the discharge terminal during a second time interval, wherein the first bias voltage and the second bias voltage are separately controlled.

13. The method of claim 12, further comprising:
determining a recharge time using the second bias voltage.

14. The method of claim 12, further comprising:
during recovery from the overload condition, maintaining an input DC level at the second bias voltage.

15. The method of claim 12, further comprising:
deriving a reference level for the comparator signal from the first bias voltage.

16. The method of claim 12, further comprising:
providing the first bias voltage with a nonlinear diode.

* * * * *